Jan. 16, 1962 — T. C. RUTLAND, JR — 3,016,603
JACK FOR ENDLESS TRACK
Filed Jan. 28, 1958 — 2 Sheets-Sheet 1
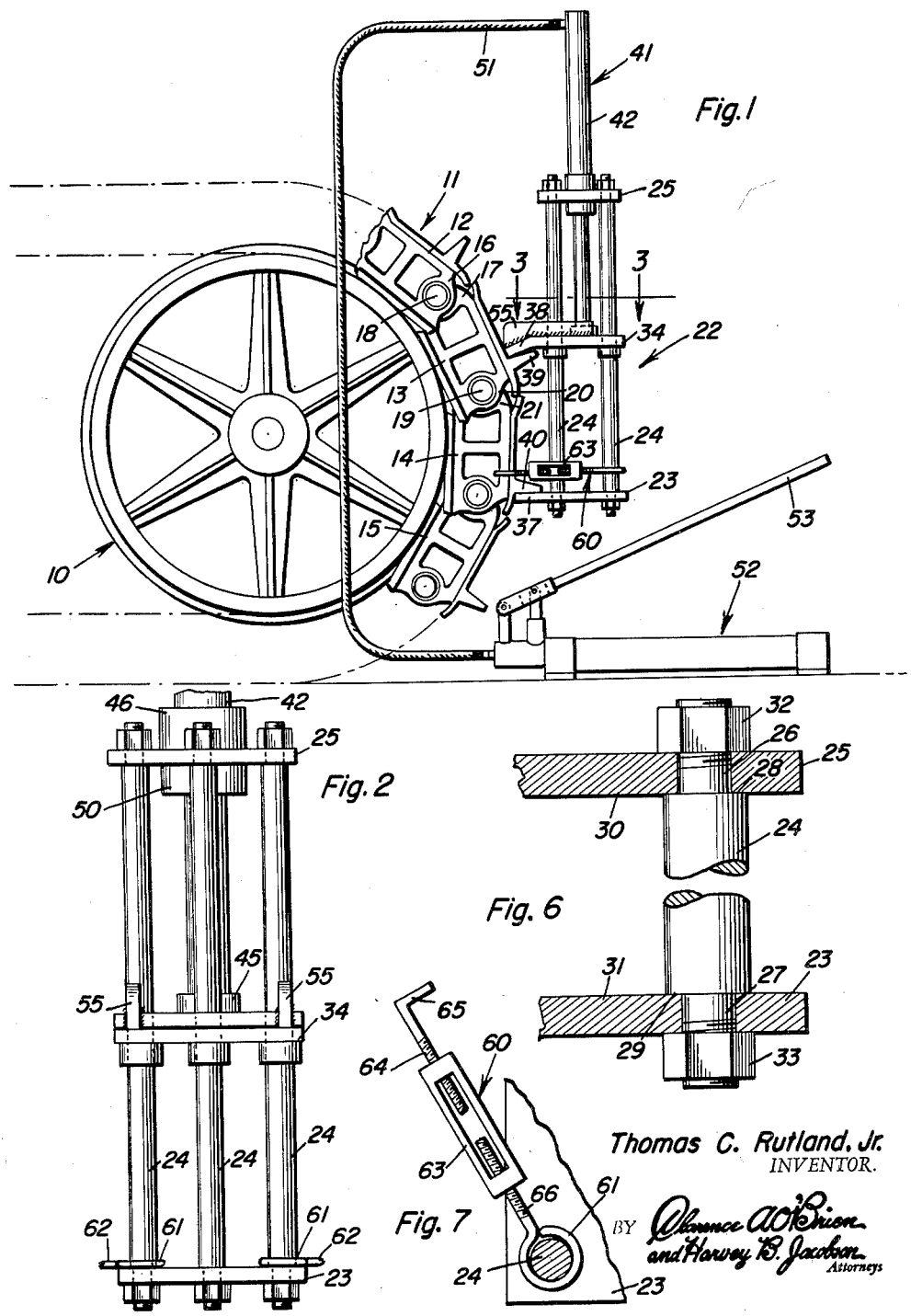
Thomas C. Rutland, Jr.
INVENTOR.

Jan. 16, 1962     T. C. RUTLAND, JR     3,016,603
JACK FOR ENDLESS TRACK
Filed Jan. 28, 1958     2 Sheets-Sheet 2
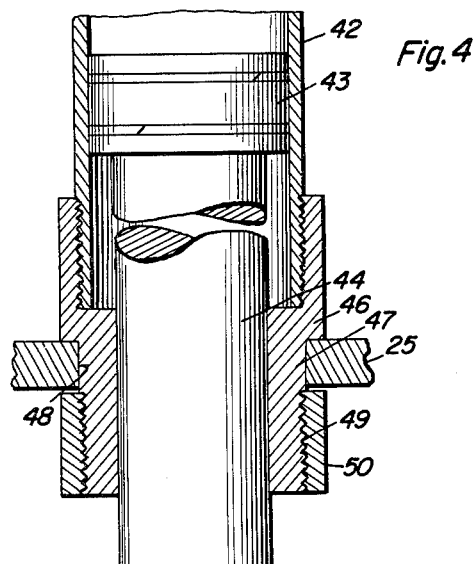
Fig. 4
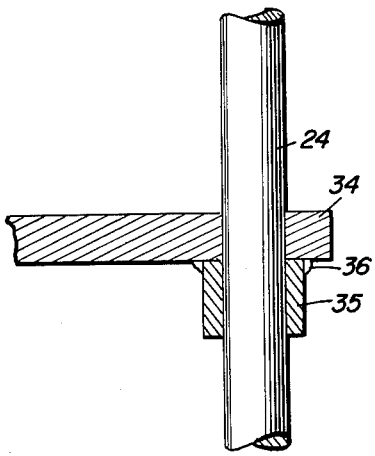
Fig. 5
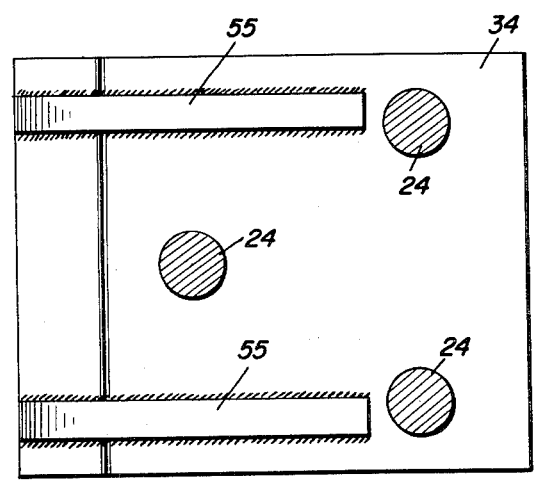
Fig. 3
Thomas C. Rutland, Jr
INVENTOR.
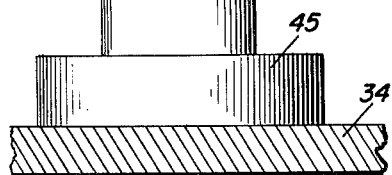
Attorneys _United States Patent Office_

3,016,603
Patented Jan. 16, 1962

3,016,603
JACK FOR ENDLESS TRACK
Thomas C. Rutland, Jr., Columbus, Ga.
(Lot 2, Steel Trailer Court, Warner Robins, Ga.)
Filed Jan. 28, 1958, Ser. No. 711,672
3 Claims. (Cl. 29—252)

This invention relates in general to tools for endless track vehicles and pertains more particularly to a device for urging two adjacent track pads toward each other either to relieve the tension therebetween for the purpose of permitting removal of a link pin joining two such pads or for the purpose of aligning the openings in the cooperating ears of such pads to permit the insertion of a link pin therethrough.

In removing or replacing the track of an endless track vehicle, the usual course of procedure is to slack off as much as possible of the take-up mechanism after having positioned the master pin or link at some point on the circumference of the drive sprocket. The master pin is then driven out which will permit the two adjacent track pads to separate, misaligning the openings in the ears therein through which the master pin extends to join the pads. In replacing the master pin, the openings in the attaching ears must be realigned and this process is usually done by prying the ends of the track together and involves the expenditure of a considerable amount of time to properly align the apertures and is, at best, a cumbersome and exasperating procedure. It is due to the difficulty in aligning these openings that the slack adjustment is backed off and it is therefore of primary concern in connection with this invention to provide means whereby removal and replacement and particularly replacement of the master pin in an endless track may be effected without the necessity of backing off the slack take-up mechanism and for doing so in a positive and efficient manner.

Another object of this invention is to provide an improved mechanism for use in connection with endless track vehicles particularly adapted to render the job of replacing a master link pin more rapid and easier and to permit the same to be accomplished by a single man and with the least expenditure of energy.

Another object of this invention is to provide a jack assembly of the character described of simple and economical manufacture and yet will be fully effective for the purposes intended.

Another object of this invention is to provide an improved mechanism for operating upon the endless tracks of endless track vehicles and particularly adapted for replacing the master pin therein including a base plate member having a portion thereof free and unobstructed so as to form a jaw engageable with a cleat of an endless track pad, and being provided with upright members guidably receiving a secondary plate thereon which is also provided with a free and unobstructed portion forming a further jaw for engagement with the cleat of the next adjacent track pad and wherein means is associated with the secondary plate for positively urging the same toward the base plate in order to position two adjacent track pads in operative alignment with each other to permit the insertion of a link pin in conjunction therewith.

Still another object of this invention is to provide a jack for use in endless track vehicles embodying a plurality of guide posts or uprights rigidly interconnected at the opposite ends thereof respectively by a base plate element and a platform and wherein there is provided intermediate these members a secondary plate which is slidably received on the posts and guided thereon for movement toward and away from the base plate, the base plate and secondary plate both being provided with opposed jaw portions for gripping the cleats of adjacent track pads therebetween to hold such pads in alignment for the insertion of the master link pin in conjunction therewith.

Another object of this invention is to provide an assembly in accordance with the preceding paragraph wherein a power transmitting element is mounted on the platform and includes a piston rod extending therefrom and connected to the secondary plate for moving the same toward the base plate to exert the aforementioned clamping action.

Another object of this invention is to provide a device of the character described wherein at least two of the posts or uprights is provided with a hook element thereon for engaging with a track pad to prevent the plates from kicking away from the track pads.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is an elevational view showing a portion of an endless track vehicle and illustrating the manner in which the invention is associated therewith;

FIGURE 2 is a front elevational view of the assembly;

FIGURE 3 is an enlarged horizontal section taken substantially along the plane of section line 3—3 in FIGURE 1 and illustrating the disposition of the guide posts or uprights;

FIGURE 4 is an enlarged sectional view taken through the power operating device which is mounted on the platform;

FIGURE 5 is an enlarged vertical section taken through the secondary plate and illustrating the manner in which the same is guidably mounted on one of the posts;

FIGURE 6 is an enlarged vertical section illustrating the manner in which the platform and base plate elements are mounted on the guide posts or uprights; and FIGURE 7 is a horizontal sectional view taken above the base plate and illustrating the safety hook utilized in conjunction therewith.

Referring at this time more particularly to FIGURE 1, the reference numeral 10 indicates the idler sprocket of an endless track vehicle and the reference numeral 11 indicates in general a portion of the endless track which is trained thereabout, the track being of the usual or conventional construction as is the idler sprocket and which elements form no part of this particular invention.

The track 11, as is usual in such constructions, includes a plurality of pad elements 12, 13, 14, 15, provided with interdigitated ear portions 16 and 17 having aligned apertures therein receiving the link pins 18 which pivotally interconnect adjacent track pads. It is usual in such constructions that the pins 18 have a sizable interference fit with one or the other of the adjacent track pads 12 or 13 such as to require the use of a substantial press in order to remove and replace such pins. However, to facilitate removal and replacement of entire track assembly, at least one pin 19 thereof is substantially loosely fitted within each of the two adjacent track pads which it joins and may be provided with suitable means such as a surclip, pin or the like, to retain this link pin in place. Removal of such pins is usually not difficult since it is only necessary to remove the retaining surclip, pin or the like and drive the same out. However, in order to replace such a pin, the usual practice is to back off of the slack take-up mechanism substantially the full amount to obtain a sufficient amount of slack in the track and to then utilize pry bars or the like in an attempt to bring the free ends of the track together so as to align the openings in the ears 20 and 21 so that the pins 19 can be replaced.

With the instant invention, however, the free ends of the track may be easily brought together and the openings in the ears 20 and 21 easily aligned so as to permit the replacement of the pin 19 therethrough. This is accomplished by the construction illustrated in FIGURE 1 and designated generally by the reference character 22 and which will be seen to consist essentially of a base plate element 23 having a plurality of uprights or guide posts 24 rigidly affixed thereto and projecting upwardly therefrom, the upper ends of the guide plates being rigidly interconnected and joined by means of a platform element indicated by the reference character 25.

FIGURE 6 illustrates the manner in which the guide posts are connected to both the base plate and the platform and, in this figure, it will be appreciated that the guide posts 24 are provided with threaded, reduced end portions 26 and 27 projecting through suitable vertically aligned apertures in the base plate and platform respectively so that the shoulders 28 and 29 provided by the reduced end portions bear against the opposed inner faces 30 and 31 of the platform and base plate. Suitable retaining nuts 32 and 33 are engaged over the projecting free ends of the reduced threaded portions of the guide rods and serve to rigidly affix the same to the base plate and to the platform.

Thus, the guide rods together with the base plate and the platform form an extremely rigid unitary assembly.

Guidably disposed on the guide rods 24 intermediate the base plate and platform is a secondary plate element 34 and which is permitted of movement up and down on the guide rods toward and away from the base plate 23, for a purpose hereinafter set forth. As can be seen most clearly in FIGURE 5, the secondary plate 34 is provided with suitable apertures slidably but snugly receiving the guide rods 24 and in register therewith and on the underside of the secondary plate are provided collars 35 welded as at 36 to the secondary plate and which serve to enlarge the bearing area surface between the secondary plate and the guide rods 24.

As can be seen most clearly in FIGURES 2 and 3, there are provided three guide rods 24 and each of the plates 23 and 34 are so situated with respect to the guide rods that two of the same are located adjacent corner portions at one end of the plates and with the third guide rod being disposed substantially near the center of each of the plates, leaving substantial portions of each of the plates 23 and 34 beyond the guide rods which are free and unobstructed so as to present the outwardly converging jaw portions 37 and 38. As is shown most clearly in FIGURE 1, these jaw portions are adapted to engage the remote faces of the outwardly projecting and transversely extending cleats 39 and 40 of adjacent track pads 13 and 14 so as to draw the same together and maintain the apertures or openings in the ears 20 and 21 aligned so as to permit the passage of the link pin 19 therethrough.

In order to exert force of a secondary plate 34 for movement toward the base plate, a hydraulic cylinder and piston assembly indicated generally by the reference character 41 is utilized including the main body portion 42 within which is slidably received a piston element 43, see particularly FIGURE 4, and having a piston rod 44 rigid therewith and extending downwardly through the open lower end of the cylinder and terminating in a foot 45 attached to the upper surface of the secondary plate 34. The assembly 41 is disposed generally medially with respect to the guide posts 24 to eliminate any cocking action on the secondary plate 34 as the same is actuated in clamping direction. The lower end of the cylinder 42 carries a coupling element 46 and a reduced portion 47 projected through an aperture 48 in the platform 25 and terminating in a threaded portion 49 receiving a nut or collar 50 thereon serving to hold the cylinder in place relative to the platform 25. The cylinder is connected to a flexible line 51 to a pump assembly indicated generally by the reference character 52 and which includes a movable handle 53 for pumping fluid therefrom into the cylinder assembly 41 to move the piston downwardly therein.

The cylinder 41 and its associated pump 52 may take any desired conventional form and may be of any required or desired tonnage.

The jaw portion 38 of the secondary plate 34 is angled downwardly as is most clearly shown in FIGURE 1 to compensate for the curvature of the idler sprocket 10 and to assure a face to face engagement between the jaw portion thereof and the cleat 39. This particular jaw may be reinforced by the rib elements 55 which are rigidly affixed to the upper surface of the secondary plate as by welding or the like.

For the purpose of safety in preventing the assembly from kicking away from the track pads as the second plate 34 is moved toward the base plate 23, a pair of safety hooks for retaining elements 60 may be provided. As can be seen most clearly in FIGURE 7, each of such safety hook elements includes an eye portion 61 encompassing one of the guide rods 24 and having a threaded shank 62 extending therefrom and engaging the turnbuckle element 63. In turn, there is provided a threaded shank 64 on the hook end of the device engaged with the turnbuckle 63 and terminating in a laterally projecting ear or leg 65 which may be disposed in a position to engage behind the track pad 14, as is shown most clearly in FIGURE 1, and to positively prevent the assembly from kicking away from the track assembly when in use. Of course, the turnbuckle 63 is provided for snugging up the safety hooks relative to the track pads.

In use, it will be apparent that the operation of replacing the link pin 19 with the assemblage above described may readily be performed by one man and without necessitating backing off of the slack take-up mechanism of the tread assembly.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A jack for removing and replacing endless tracks of the type comprising a plurality of track pad elements having outwardly projecting and transversely extending cleats and provided with interdigitated ear portions having aligned apertures receiving a connecting link pivot pin; said jack comprising generally parallel base plate and platform members, at least three parallel guide posts secured and extending between said base plate and platform members, an extensible motor having a stationary portion with an elongated movable portion extending outwardly therefrom, said stationary portion mounted on said platform member and said movable portion extending through said platform member between said guide posts and mounted for reciprocating movement in directions paralleling said guide posts, a second plate disposed between said platform and base plate members, secured to the outer end of said movable portion and including means snugly and slidably receiving said guide posts, said base and second plates including opposing plate-like jaw portions disposed to one side of and extending transversely of said guide posts, said jaw portions including substantially flat outwardly convergent confronting surfaces of a size and shape adapted to engage the outwardly divergent remote surfaces of two cleats of an endless track positioned at a curved portion of the closed path of movement of the track in surface to surface contacting relation with said remote surfaces, an elongated safety hook element, means on one end of said safety hook element pivotally and slidably securing the latter to one of said guide posts for pivotal movement thereabout and sliding movement longitudinally therealong and including a laterally directed ear on the other end adapted to be engaged behind an associated track pad to prevent the jack from kicking away from the track pad when the second plate is moved toward the base plate.

2. The combination of claim 1 wherein said safety hook element includes means for adjusting its effective length.

3. The combination of claim 1 wherein said hook element includes a turnbuckle assembly whereby its effective length may be adjusted.

References Cited in the file of this patent

UNITED STATES PATENTS

| | | |
|---|---|---|
| 409,008 | Breymann | Aug. 13, 1889 |
| 805,628 | Buttner | Nov. 28, 1905 |
| 1,866,125 | Patterson | July 5, 1932 |
| 2,085,529 | Heimbach et al. | June 29, 1937 |
| 2,101,889 | Anderson | Dec. 14, 1937 |
| 2,234,819 | Butcher | Mar. 11, 1941 |
| 2,288,097 | Lucker | June 30, 1942 |
| 2,440,512 | Jakowhek et al. | Apr. 27, 1948 |
| 2,822,670 | Suderow | Feb. 11, 1958 |